(12) United States Patent
Hummel et al.

(10) Patent No.: US 6,738,917 B2
(45) Date of Patent: May 18, 2004

(54) LOW LATENCY SYNCHRONIZATION OF ASYNCHRONOUS DATA

(75) Inventors: Mark D. Hummel, Franklin, MA (US); Gerald R. Talbot, Concord, MA (US)

(73) Assignee: Alliance Semiconductor Corporation, Santa Clara, CA (US)

( * ) Notice: Subject to any disclaimer, the term of this patent is extended or adjusted under 35 U.S.C. 154(b) by 649 days.

(21) Appl. No.: 09/753,916

(22) Filed: Jan. 3, 2001

(65) Prior Publication Data

US 2002/0087909 A1 Jul. 4, 2002

(51) Int. Cl.$^7$ ................................. G06F 1/04
(52) U.S. Cl. ........................ 713/400; 713/600
(58) Field of Search ................. 713/400, 401, 713/500, 501, 503, 600

(56) References Cited

U.S. PATENT DOCUMENTS

| | | | | |
|---|---|---|---|---|
| 5,179,664 A | * | 1/1993 | Li et al. .................... | 710/61 |
| 5,293,409 A | * | 3/1994 | Doornenbal et al. ........ | 375/354 |
| 5,602,882 A | * | 2/1997 | Co et al. .................... | 375/372 |
| 5,799,175 A | * | 8/1998 | Cassiday et al. ............ | 713/400 |
| 6,055,285 A | * | 4/2000 | Alston ........................ | 375/372 |
| 6,594,329 B1 | * | 7/2003 | Susnow ...................... | 375/372 |

* cited by examiner

*Primary Examiner*—Dennis M. Butler
(74) *Attorney, Agent, or Firm*—LaRiviere, Grubman & Payne, LLP

(57) ABSTRACT

A low latency method of synchronizing asynchronous data to a core clock in a receiving device. A communication referenced to a transmitting clock that is asynchronous to the core clock is received at a receiving device. The communication includes a synchronization signal which is propagated through a synchronizer in the receiving device to synchronize the signal to the core clock. Upon receipt of the synchronization signal by the synchronizer, a load pointer for loading received data into a buffer synchronous with the transmitting clock is reset. Upon completion of the propagation of the synchronization signal through the synchronizer, an unload pointer for unloaded the data from the buffer synchronous with the core clock is reset. The unload pointer is then offset by an amount that compensates for the delay incurred while the synchronization propagated through the synchronizer. Thereafter, the position of the unload pointer is dynamically adjusted based on the accumulated amount of data loaded into the buffer and the accumulated amount of data unloaded from the buffer.

35 Claims, 7 Drawing Sheets

LOW LATENCY SYNCHRONIZATION OF ASYNCHRONOUS DATA

BACKGROUND OF THE INVENTION

1. Field of the Invention

The present invention relates generally to the synchronization of asynchronous data and, more particularly, to a low latency method of synchronizing high-speed asynchronous data.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In many computing systems, communications are transmitted between various interconnected devices. These devices may include processing devices coupled together via a host communication medium, as well as input/output (I/O) devices coupled together via an I/O communication medium. Each of these devices generally includes a core clock which provides the timing reference for internal data processing logic. Accordingly, communications internal to each device are referenced to the device's core clock. Further, each of the devices in a computing system may be configured to generate and transmit communications to other devices in the computing system. Such communications, also may be referenced to the transmitting device's core clock.

Devices in the computing system may be configured to operate in either a synchronous data communication mode or an asynchronous data communication mode. In the synchronous mode, the core clocks of the transmitting and receiving devices are derived from a common time base. Thus, the transmission and receipt of data is synchronous to the common time base, although the core clocks in the transmitting and receiving devices may have different frequencies. In the synchronous mode, no special provisions for ensuring accurate receipt and sampling of data in the receiving device are provided.

In the asynchronous mode, the core clock in the transmitting device is not derived from the same time base source as the core clock in the receiving device. As a result of the different time bases, the data may not be received and sampled accurately in the receiving device because the behavior of the data sampling logic may be unpredictable due to metastability effects. To address this problem, the transmitted data is synchronized to the core clock in the receiving device as the data propagates from the transmitting clock domain to the receiving clock domain.

Data synchronization may be accomplished by delaying the data as it propagates to the receiving clock domain. In some computing systems, the delay may be implemented by routing the data through, for example, a series of buffers (e.g., flip-flop devices) clocked by the receiving clock. The number of buffers connected in series determines the amount of the propagation delay. The longer the delay, the greater the probability that unpredictable behavior (i.e., metastability) will not occur and that the data may be accurately sampled when received into the receiving clock domain.

Although this approach to data synchronization may reduce the probability of data sampling errors due to metastability, it does so at the cost of delaying the receipt of synchronized data in the receiving clock domain. As computing systems operate at progressively higher frequencies, more stages of buffering are required and the data latency incurred as a result of the synchronization process becomes more relevant. Accordingly, it would be desirable to provide a data synchronization scheme that substantially reduces the probability of errors due to metastability, yet also substantially reduces or obscures the latency that otherwise may be incurred by the synchronization of the data.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method of synchronizing data to a receiving clock in a receiving clock domain. The method comprises the acts of receiving a communication that is referenced to a transmitting clock asynchronous to the receiving clock and which includes data and a synchronization signal. The synchronization signal is synchronized to the receiving clock. A load pointer for loading data into a buffer synchronous with the transmitting clock is reset in response to receipt of the synchronization signal. An unload pointer for unloading data from the buffer synchronous with the receiving clock is reset in response to the completion of the synchronizing of the synchronization signal. The unload pointer also is offset by an initial offset corresponding to an amount of data loaded into the buffer during the synchronizing of the synchronization signal.

In accordance with another aspect of the present invention, there is provided a method of synchronizing data to a receiving clock in a receiving clock domain. The method comprises receiving a communication referenced to a transmitting clock that is asynchronous with the receiving clock. The communication includes data and a synchronization signal. A load pointer for loading data into a buffer synchronous with the transmitting clock is reset in response to receipt of the synchronization signal. To synchronize the synchronization signal to the receiving clock, the propagation of the synchronization signal into the receiving clock domain is delayed. An unload position for an unload pointer, which unloads data from the buffer synchronous with the receiving clock, is determined in response to completion of the synchronization of the synchronization signal. The unload position compensates for the synchronization delay.

In accordance with still another aspect of the present invention, there is provided a device for use in a computing system. The device comprises a core clock and a receive port configured to receive a communication referenced to a transmitting clock that is asynchronous with the core clock. The communication comprises data and a synchronization signal. The receive port comprises a synchronizer to receive the synchronization signal and synchronize it to the core clock, a buffer, a load pointer for loading; data into the buffer synchronous with the transmitting clock, and an unload buffer for unloading data from the buffer synchronous with the core clock. The receive port also comprises unload pointer offset logic in communication with the synchronizer and the unload pointer. The load pointer is reset to a reset position in response to receipt of the synchronization signal by the synchronizer. The unload pointer offset logic is configured to determine an offset amount of the unload pointer from the reset position in response to synchronization of the synchronization signal.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
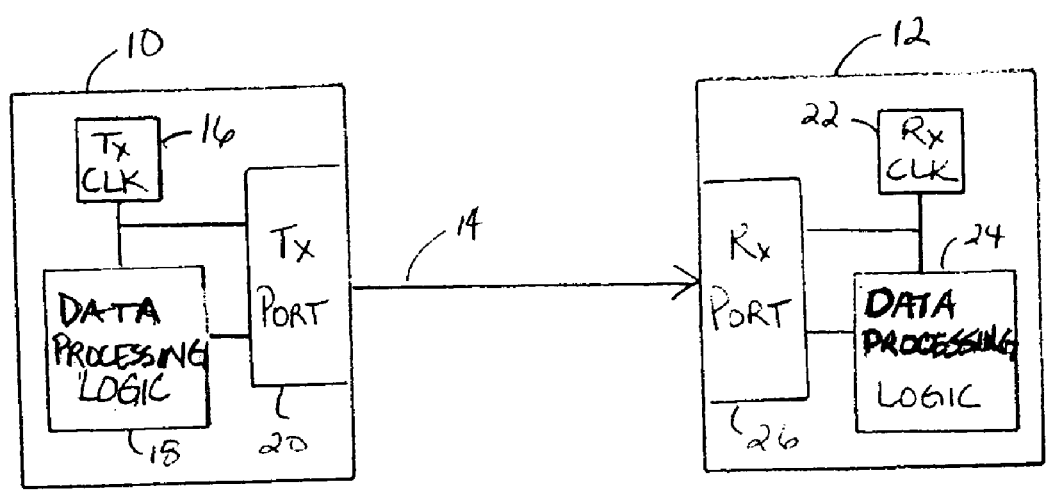
FIG. 1 illustrates a transmitting device transmitting an asynchronous communication to a receiving device, in accordance with the invention.

Turning now to the figures, and with reference in particular to FIG. 1, a transmitting device 10 is configured to transmit an asynchronous communication to a receiving device 12. The devices 10 and 12 may be any type of device that may be connected in a computing system and between which communications may be exchanged. For example, devices 10 and 12 may be processing devices that perform host processing functions. Such processing devices may include a core processor configured to execute software code in accordance with a predefined instruction set, memory components, a memory controller, logic for processing data and managing communications, appropriate interface components (e.g., transmitters, receivers, buffers, etc.), etc. Alternatively, devices 10 and 12 may be peripheral or input/output (I/O) devices which embody one or more I/O functions, such as a modem, sound card, etc. In addition to components for performing the I/O functionality, an I/O device also may include logic for processing data and managing communications, appropriate interface components (e.g., transmitters, receivers, buffers, etc.), etc.

The devices 10 and 12 are interconnected via a communication medium. In the embodiment illustrated in FIG. 1, a unidirectional point-to-point link 14 is shown connecting the device 10 to the device 12. However, it should be understood that the communication medium may be a bi-directional point-to-point link comprising a pair of oppositely directed unidirectional links. Each unidirectional link may comprise a plurality of transmission media (e.g., wires, etc.) for carrying different types of information.

For example, in one embodiment, each unidirectional point-to-point link may include separate transmission media for a clock (CLK) signal, a control (CTL) signal, and a command/address/data (CAD) signal. The CLK signal serves as the clock for the CTL and CAD signals. The CAD signal conveys control information and data. The CAD signal may be $2^n$ bits wide and, thus, may be conveyed on $2^n$ separate transmission media. The CTL signal is asserted when the CAD signal conveys control information and is deasserted when the CAD signal conveys data. The CTL and CAD signals may convey information on the rising edges, the falling edges, or both the rising and falling edges of the CLK signal. Alternative embodiments may use a medium having a different configuration and which conveys communications in a different manner.

Referring again to FIG. 1, the transmitting device 10 is illustrated as including a transmitting clock (Tx CLK) 16, data processing logic 18, and a transmit (Tx) port 20. The transmitting clock 16 provides the timing reference for the data processing functions performed by the logic 18, such as the generation, management, ordering, etc. of communication packets. Similarly, all communications generated and transmitted by the device 10 via the transmit port 20 are referenced to, or derived from the same time base as, the transmitting clock 16. Thus, when transmitted communications initially are received at the receive port 26 of the receiving device 12, the communications are in, or referenced to, the transmitting clock 16 domain.

Likewise, the receiving device 12 is illustrated as including a receiving clock (RxCLK) 22, data processing logic 24, and a receive (Rx) port 26. The receiving clock 22 provides the timing reference for the receive port 26 and the data processing functions performed by the logic 24. In the embodiment illustrated, the transmitting clock 16 and the receiving clock 22 are derived from different time base sources and, thus, are asynchronous. However, asynchronous communications that are received by the receive port 26 are synchronized to the receiving clock 22 (i.e., received in the receiving clock 22 domain) before the communications may be handled by the data processing logic 24.

Figure 2:
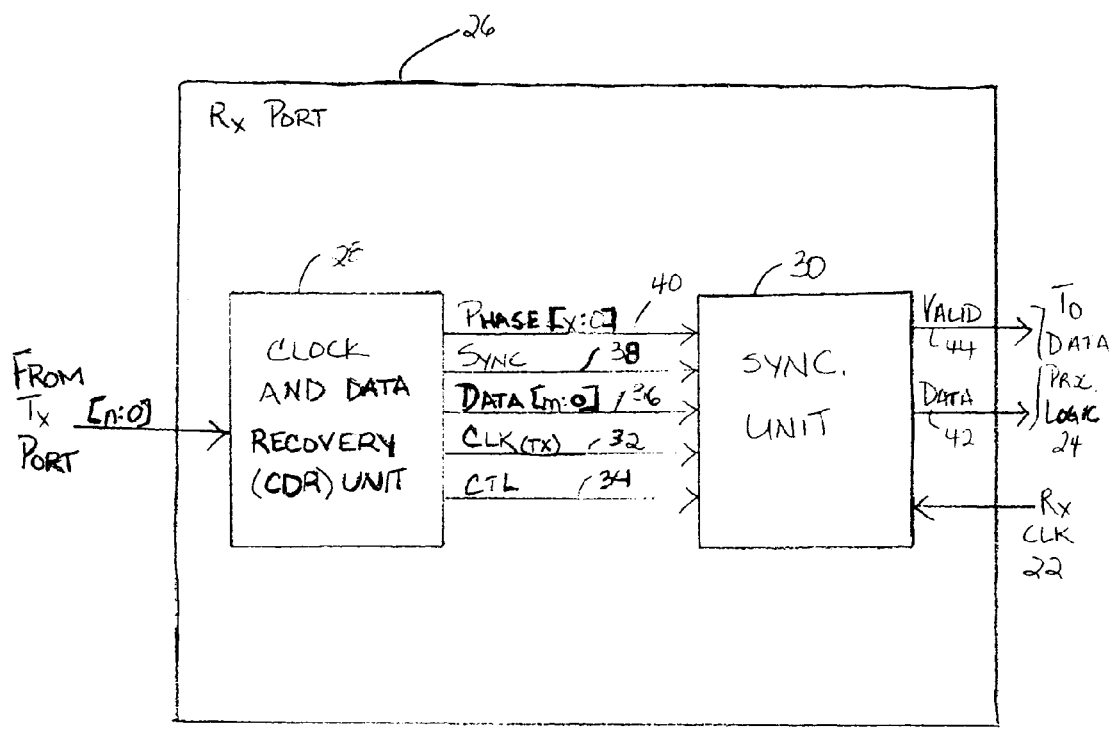
FIG. 2 illustrates an exemplary embodiment of a receive port of the receiving device of FIG. 1.

An exemplary embodiment of the receive port 26 of the device 12 is illustrated in FIG. 2. The receive port 26 includes a clock and data recovery (CDR) unit 28, which receives an asynchronous communication referenced to the transmitting clock 16 domain, and a synchronization unit 30, which outputs the synchronized communication in the receiving clock 22 domain. The CDR unit 28 includes appropriate hardware and/or software to receive an asynchronous communication and recover clock and data information from the communication. In an exemplary embodiment, an n-bit communication that is referenced to a timing source (i.e., the transmitting clock 16) asynchronous to the receiving clock 22 in the receiving device 12 is received at the receive port 26. The n-bit communication [n:0] (e.g., 8 bit) is input to the CDR unit 28, which processes the communication in a manner appropriate to convert the asynchronous n-bit communication into a clock (CLK$_{(TX)}$) signal 32, a control (CTL) signal 34, and a parallel m-bit (e.g., 32-bit) data signal 36.

The CLK$_{(TX)}$ signal 32 generated by the CDR unit 28 is synchronous with the transmitting clock 16 as is represented by the parenthetical reference Tx in FIG. 2. The generated clock signal 32 may have the same frequency as the transmitting clock 16, or may have a frequency that is a multiple or a fraction of the frequency of the transmitting clock 16. For example, in one embodiment, the CLK$_{(TX)}$ signal 32 has a frequency (e.g., 250 MHz) that is one-half the frequency (e.g., 500 MHz) of the transmitting clock 16. However, in alternative embodiments, the CLK$_{(TX)}$ signal 32 may have a higher frequency than the frequency of the transmitting clock 16.

The CDR unit 28 also is configured to detect synchronization patterns that may be present in the n-bit asynchronous communication. Synchronization patterns may be used in a computing system during a reset or power-up sequence that involves the initialization of the various interconnected devices and interconnecting links. For example, in a computing system having a communication medium implemented as a plurality of independent bi-directional point-to-point links interconnecting pairs of devices, the initialization of the devices may include procedures by which respective pairs of devices determine common communication frequencies and link widths. The synchronization pattern may be formatted such that the start of the sequence, indicating that the devices are ready for initialization, may be recognized. Similarly, the synchronization pattern may be formatted such that the termination of the pattern, indicating the end of the initialization process, is easily detected. The synchronization pattern itself may be used to configure and initialize synchronization logic in the receiving device 12.

The specific format of the synchronization pattern may depend on the particular computing system and the application in which the devices are being used. For any particular computing system, the CDR unit 28 may be configured to recognize the particular pattern that is implemented or the assertion and deassertion of certain signals that indicate the beginning and end of the synchronization pattern. In an exemplary embodiment, the CDR unit 28 detects the synchronization pattern, including the start and termination of the pattern, and generates a synchronization signal 38 representative thereof.

The CDR unit 28 also generates a phase[x:0] signal 40 which also is used in the initialization of the synchronization unit 30. In addition, the phase[x:0] signal 40 is used to keep track of the amount of data being received by the receiving device 12 after initialization is complete. As will be described below, tracking the amount of received data (in conjunction with other parameters) facilitates the reduction of the latency, or the appearance of the latency, that might otherwise result from the synchronization process.

As illustrated in FIG. 2, the receiving clock 22 also is provided as an input to the synchronization unit 30. After initialization of the synchronization unit 30, the synchronization unit 30 has the capability to provide data synchronous with the receiving clock 22 at the output 42. The synchronization unit 30 may also provide a valid signal 44 to indicate that the signal on the data output 42 is valid and synchronized.

Figure 3:
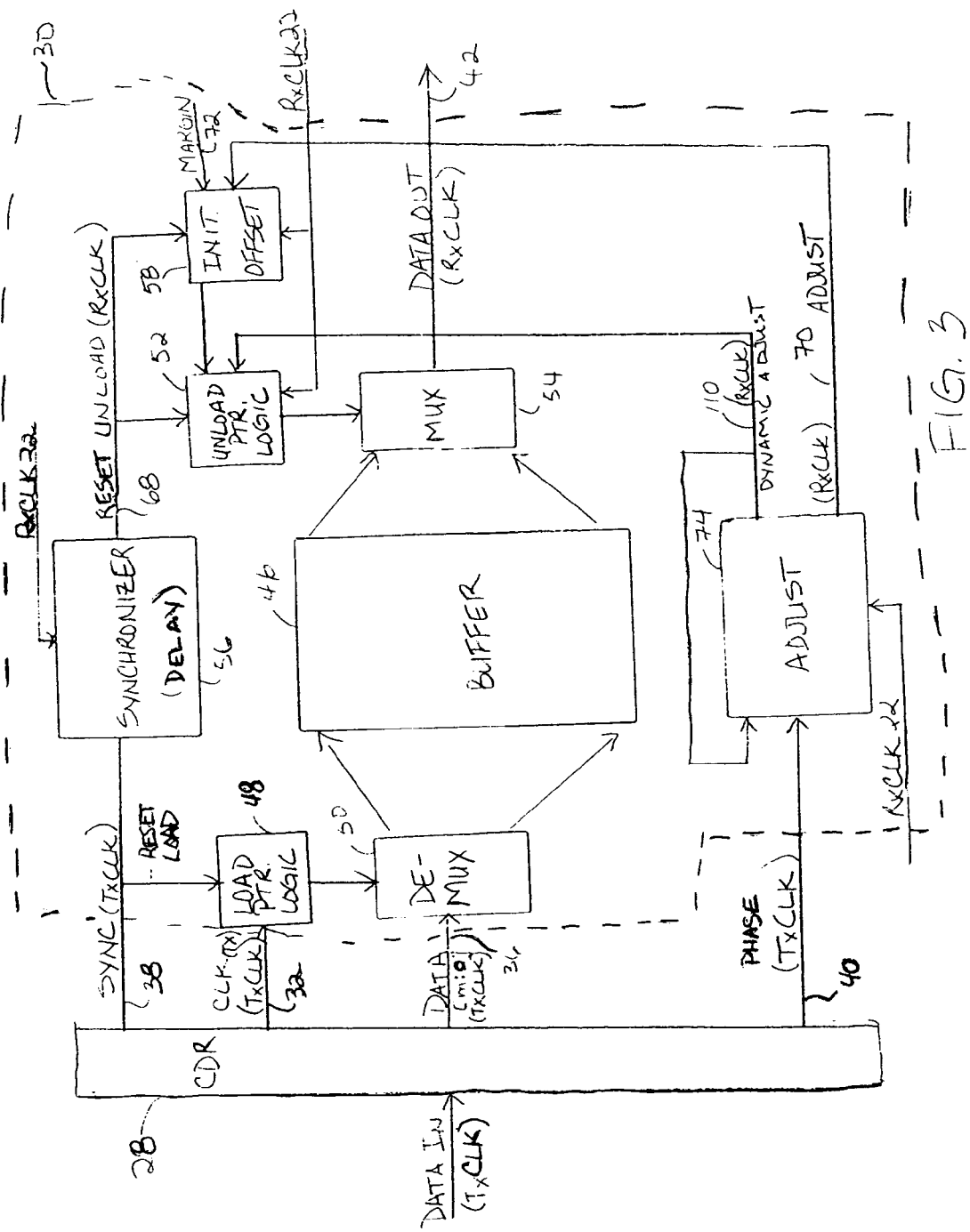
FIG. 3 illustrates a block diagram of an exemplary embodiment of a synchronization unit included in the receive port of FIG. 2, which provides for low latency synchronization of asynchronous data received from the transmitting device, in accordance with the invention.

FIG. 3 illustrates a block diagram of an exemplary embodiment of the synchronization unit 30, which receives the synchronization signal 38, the CLK$_{(TX)}$ signal 32, the control signal 34 (not shown), the data[m:0] signal 36, and the phase[x:0] signal from the CDR unit 28. The receiving clock 22 from the receiving clock domain also is input to the synchronization unit 30. In FIG. 3, parenthetical references to TxCLK (i.e., the transmitting clock 16) and RxCLK (i.e., the receiving clock 22) indicate that the corresponding signals are in (i.e., are referenced to) the transmitting clock 16 domain and the receiving clock 22 domain, respectively.

The synchronization unit 30 includes a buffer 46 (e.g., a first-in first-out buffer) to buffer the received asynchronous data as it is passing from the transmitting clock domain to the receiving clock domain; load pointer logic 48 to provide a load pointer to load the data from a demultiplexor 50 into the buffer 46 synchronous with the transmitting clock 16; and unload pointer logic 52 to provide an unload pointer to unload the data from the buffer 46 through a multiplexor 54 synchronous with the receiving clock 22.

When the synchronization signal 38 indicates the termination of the synchronization pattern, the load pointer logic 48 resets the load pointer. The terminating synchronization signal 38 then propagates through a synchronizer 56 which is configured to result in initialization and synchronization of the unload pointer in a manner that reduces the probability of data errors due to metastability. That is, to reduce the probability of error, the synchronizer 56 delays the propagation of the synchronization signal 38 into the receiving clock domain. The length of the delay is calculated using parameters derived from a circuit analysis of the synchronizer 56 and a conventional probabilistic analysis of the transmitting and receiving clock signals. The calculation yields an appropriate length of delay that will limit the probability of a system failure due to the metastability effects to a desired, or acceptable, level. In general, a longer delay reduces the probability of failure.

Figure 4:
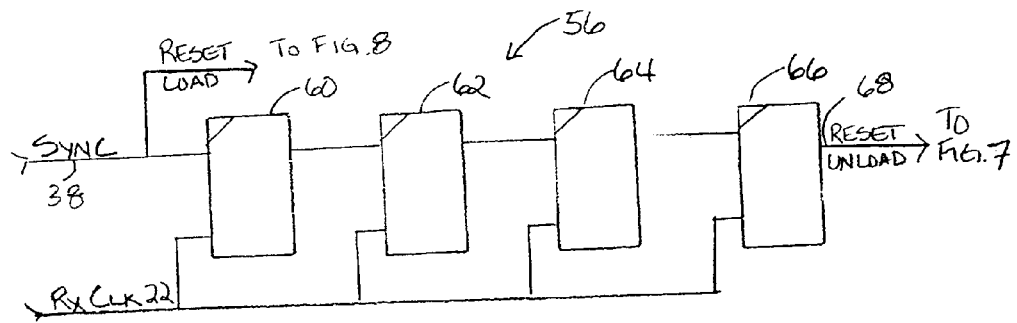
FIG. 4 illustrates an exemplary embodiment of a synchronizer included in the synchronization unit of FIG. 3, the synchronizer synchronizing an asynchronous signal to the receiving clock in the receiving device, in accordance with the invention.

FIG. 4 illustrates an exemplary embodiment of the synchronizer 56 which is configured to synchronize the Sync signal 38 by introducing a delay of the appropriate length to reduce the probability of failure. The synchronizer 56 includes four stages of flip-flop devices 60, 62, 64, and 66 that are clocked by the receiving clock 22. Thus, the propagation of the synchronization signal 38 from the transmitting clock 16 domain to the receiving clock 22 domain is delayed by four cycles of the receiving clock 22, which has a frequency of 133 MHz. In the exemplary embodiment, a delay of four receiving clock cycles corresponds to a mean time between failure (MTBF) of $3 \times 10^{16}$ seconds. Alternative embodiments of the synchronizer 56 may include fewer or more stages, dependent on the desired limit on the probability of failure due to metastability effects. As discussed above, when the synchronization signal 38 indicates the termination of the synchronization sequence, the load pointer logic 48 resets the load pointer. The completion of the synchronization of the synchronization signal 38 with the receiving clock 22, which occurs when the terminating synchronization signal 38 completes propagation into the receiving clock domain at the output 68 of the synchronizer 56, serves to synchronize and trigger the reset of the unload pointer by the unload pointer logic 52.

However, between the time the load pointer is reset and the time the unload pointer is reset, data is being received by the receiving device 12 and loaded into the buffer 46. Thus, when indication of the completion of the synchronization sequence is received into the receiving clock domain and the unload pointer is reset, the difference between the positions of the load pointer and the unload pointer corresponds approximately to the length of the delay introduced by the synchronizer 56. Because data is loaded into the buffer 46 while the terminating synchronization signal 32 propagates through the synchronizer 56, the length of the delay also is representative of the amount of data has been loaded into the buffer 46. If the positional difference between the load pointer and the unload pointer is maintained, a significant latency in receipt of synchronized data into the receiving clock domain may be introduced.

To compensate for (or conceal) this latency, the relationship between the load pointer and unload pointer may be adjusted such that data may be unloaded from the buffer 46 in a reduced amount of time, such as the minimum time possible. The minimum time for unloading the data is dependent on the physical properties of the buffer 46, the demultiplexor 50, and the multiplexor 54, as well as uncertainty factors introduced by the system. For example, components of the minimum unload time may include the amount of time for the data to propagate through the demultiplexor 50, settle into the buffer 46, and then propagate out through the multiplexor 54. Further, the uncertainty introduced by the amount of jitter in the transmitting clock 16 and the receiving clock 22 and the possible phase shift that may occur between the clocks 16 and 22 may be taken into account. Still further, any uncertainty that the synchronization signal 38 was accurately sampled by the synchronizer 56 may be a factor to consider. In an exemplary embodiment, the minimum unload time is less than one cycle of the receiving clock 22 which operates at a frequency of 133 MHz, while the latency introduced by the synchronizer 56 corresponds to several (e.g., four or more) cycles of the receive clock 22. Thus, offsetting the unload pointer may result in significant reduction in the data latency.

Referring again to FIG. 3, the synchronization unit 30 includes initial offset logic 58 which provides an input signal to the unload pointer logic 52 to offset the unload pointer from the initial reset position established upon synchronization of the terminating synchronization signal 38. In the embodiment illustrated, the initial offset logic 58 receives two input signals 70 and 72, which are used to determine the amount of the offset. The input signal 70 is an "Adjust" value that is provided by adjust logic 74 and is representative of the amount of data that was loaded into the buffer 46 during the time the synchronization signal 38 propagated through the synchronizer 56. Thus, the Adjust value 70 also is indicative of the amount of movement of the load pointer from its initial reset position. In an exemplary embodiment, the adjust logic 74 may approximate the amount of data loaded into the buffer 46 by detecting the number of edges of the transmitting clock 16 that were received during the synchronization of the synchronization signal 38, as will be described in detail below. Thus, the "Adjust" value 70 corresponds to "Edges" of the transmitting clock 16. The initial offset logic 58 adds the Adjust value 70 to the reset position of the unload pointer 52, thus causing the unload pointer logic 52 to move the unload pointer closer in position to the load pointer and compensating for the latency introduced by the synchronizer 56.

Figure 5:
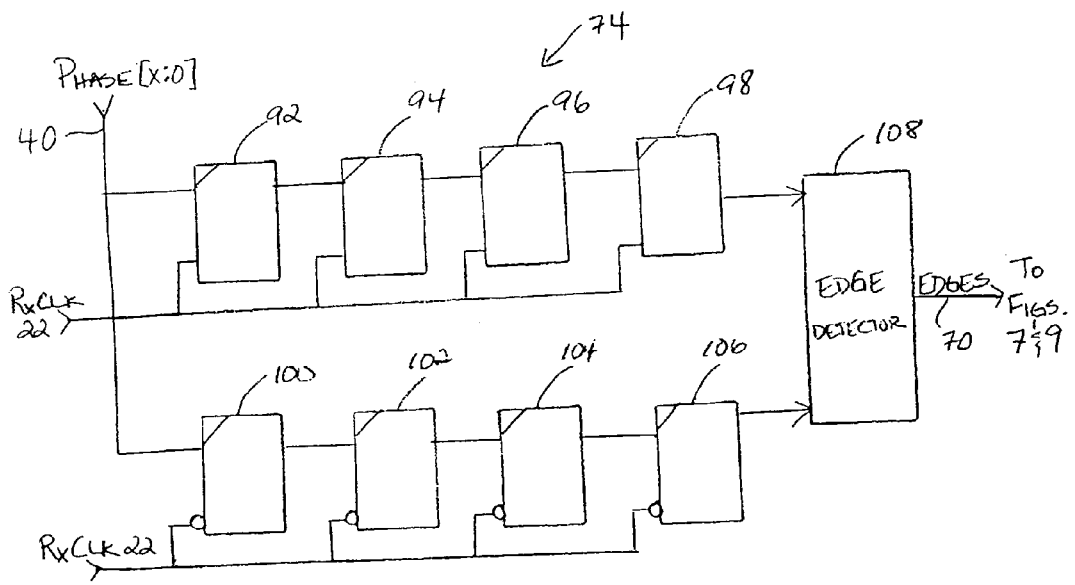
FIG. 5 illustrates an exemplary embodiment of a portion of the unload pointer adjust logic of the synchronization unit shown in FIG. 3, which determines an initial offset value for the unload pointer, in accordance with the invention.

FIG. 5 illustrates an exemplary embodiment of the adjust logic 74 which provides the Adjust (i.e., Edges) value signal 70 to the initial offset logic 58. Because the $CLK_{(TX)}$ signal 32 is synchronous with the transmitting clock 16 and provides the timing reference to the load pointer logic 48 (see FIG. 3), the approximate amount of data loaded into the buffer during any time period may be determined by detecting the number of data transmitting edges of the transmitting clock 16 signal received during that period. In an exemplary embodiment, 16 bits of data are transmitted in a communication from the transmitting device 10 on each rising edge of the transmitting clock 16 signal, which has a frequency of 500 MHz. As discussed above, the CDR unit 28 converts the communication into a $CLK_{(TX)}$ signal 32 and a 32-bit parallel data signal 36. The $CLK_{(TX)}$ signal 32 is synchronous with the transmitting clock 16 signal, but has a frequency that is one-half the frequency of the transmitting clock 16 signal (i.e., 250 MHz). Thus, 32 bits of data are loaded into the buffer 46 for each cycle of the $CLK_{(TX)}$ signal 32 (i.e., which is equivalent to two cycles of the transmitting clock 16 signal). As a result, the approximate amount of data loaded into the buffer during any time period may be determined by detecting the number of rising edges of the transmitting clock 16 signal received during that period.

To facilitate the counting of the data transmitting (e.g., rising) edges of the transmitting clock 16 signal, the CDR unit 28 generates the phase[x:0] signals 40 such that each data transmitting edge of the transmitting clock 16 signal corresponds to an edge (e.g., rising or falling) of one of the phase signals 40. Further, to ensure that the edges of each phase signal are accurately sampled by a synchronizer and an edge detector which are referenced to the receiving clock 22, the frequency of each phase signal 40 is less than one-half the frequency of the frequency at which the phase signals are sampled.

Figure 6:
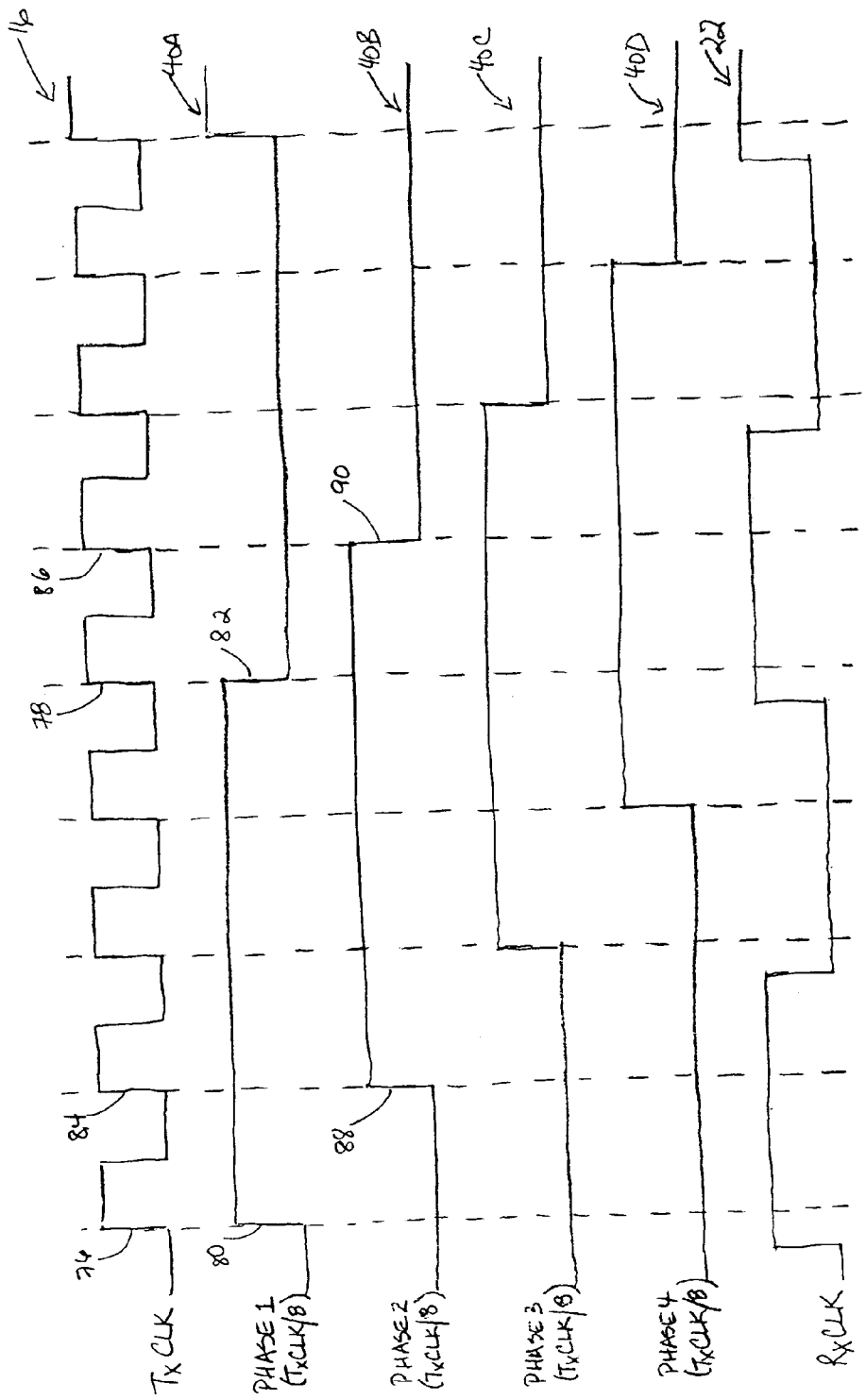
FIG. 6 illustrates an exemplary relationship between phase signals generated by the synchronization unit of FIG.2, the transmit clock signal, and the receive clock signal.

FIG. 6 illustrates exemplary phase signals 40A, 40B, 40C, and 40D and their relationship to the transmitting clock 16 signal and the receiving clock 22 signal. As shown in FIG. 6, each phase signal 40A, 40B, 40C, and 40D is synchronous with the transmitting clock 16 signal and asynchronous to the receiving clock 22 signal. Further, each phase signal has a 50% duty cycle and is shifted in time from the previous phase signal by one cycle of the transmitting clock signal 16. Thus, as illustrated by the dashed lines in FIG. 6, each rising edge of the transmitting clock 16 signal maps to either a rising or falling edge of one of the phase signals 40A–D. For example, rising edge 76 and rising edge 78 of the transmitting clock 16 signal map to the rising edge 80 and the falling edge 82, respectively, of the phase signal 40A. Similarly, rising edge 84 and rising edge 86 of the transmitting clock 16 signal map to the rising edge 88 and the falling edge 90, respectively, of the phase signal 40B, and so forth.

In addition, each phase signal 40 has a frequency that is less than one-half the frequency at which the phase signals are sampled in the receiving clock domain to ensure that each edge of the phase signals 40 may be detected by logic that is referenced to the receiving clock 22. In an exemplary embodiment, the transmitting clock 16 frequency is 500 MHz, the receiving clock 22 frequency is 133 MHz, and the synchronizer and edge detection circuitry are configured to sample the phase signals on both edges of the receiving clock 22. As a result, the effective frequency at which the phase signals are sampled is twice the receiving clock frequency (i.e., 266 MHz). Further, in the exemplary embodiment, the CDR unit 28 is configured to establish the frequency of the phase signals 40 by dividing the frequency of the transmitting clock 16 by a factor of 8 to obtain a phase signal 40 frequency of 62.5 MHz (which is less than one-half of 266 MHz). The value of the divisor for the transmitting clock 16 frequency may vary depending on the particular computing system. In the exemplary embodiment, the value of the divisor is predetermined and appropriately stored in the CDR unit 28. However, in other embodiments, the CDR unit 28 may be configured to determine an appropriate value for the divisor, by determining the respective frequencies of the transmitting clock 16 and the receiving clock 22 for example.

Finally, because both rising and falling edges of each phase signal 40 are detected by the edge detection logic illustrated in FIG. 5, the generation of four phase signals 40A, 40B, 40C, and 40D, which are shifted from one another by one cycle of the transmitting clock 16 and have a 50% duty cycle, ensures that each rising edge of the transmitting clock 16 signal maps to either a rising or falling edge of one of the phase signals 40. Alternative embodiments may employ fewer or more phase signals 40. For example, eight phase signals 40 may be generated if the synchronizer and edge detection logic is configured to detect only rising edges of the phase signals 40.

Returning to FIG. 5, an exemplary embodiment of a portion of the synchronizer and edge detection logic for the adjust logic 74 is illustrated. Each phase signal 40A, 40B, 40C, and 40D is propagated through a respective series of flip-flops, such as flip-flops 92, 94, 96, and 98, which are clocked by the rising edge of the receiving clock 22. Similarly, each phase signal 40A, 40B, 40C, and 40D is propagated through another respective series of flip-flops, such as flip-flops 100, 102, 104, and 106, which are clocked by the falling edge of the receiving clock 22. The edge detector logic 108 is configured to detect the number of rising and falling edges of each of the phase signals 40A–D which occurred during each cycle of the receiving clock 22. The edge detector 108 further is configured to sum the number of edges of all the phase signals 40A–D and to provide an output signal (i.e., Edges (or Adjust) signal 70) which corresponds to the total number of data transmitting edges of the transmitting clock 16 detected each receive clock 22 cycle.

Passing the phase signals 40A–D through multiple stages of flip-flops reduces the probability of failure due to metastability effects. Thus, the number of flip-flop stages may be determined by the same type of circuit analysis and probabilistic analysis performed with respect to the synchronizer 56. In the exemplary embodiment illustrated, four stages of flip-flops are implemented, thus introducing a delay of four cycles of the receiving clock 22. In the exemplary embodiment, this length of delay yields an MTBF of $3 \times 10^{16}$ seconds. In other embodiments, a different length of delay may be implemented. In general, as discussed above, the longer the length of the delay, the less likely it is that failure will occur.

Returning to FIG. 3, the other input signal 72 provided to the initial offset logic 58 is the "Margin" value which is representative of the minimum unload time for reliably unloading data from the buffer 46. As discussed above, the minimum unload time is dependent on several factors, including physical characteristics of the circuit components as well as the degree of uncertainty in the clock signals and the synchronizer 56. In the exemplary embodiment, the value for the Margin 72 is predetermined and appropriately stored in the receiving device 12 based on a consideration of these factors. The initial offset logic 58 subtracts the Margin amount 72 from the initial reset position of the unload pointer, thus backing the position of the unload pointer away from the load pointer and ensuring that the minimum unload time is observed. Alternatively, the initial offset logic 58 may be configured such that a value of "0" for the Margin ensures that the minimum unload time will be satisfied.

Figure 7:
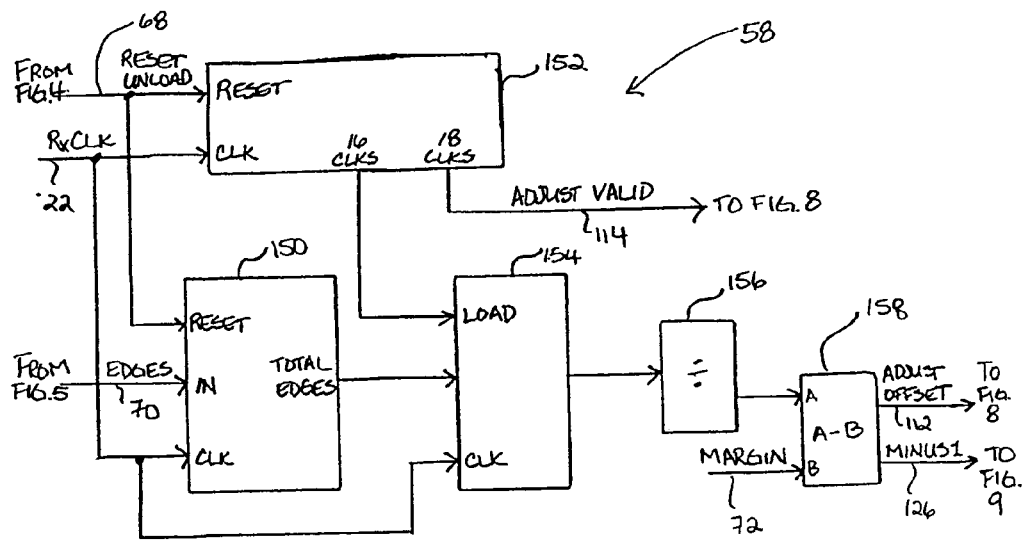
FIG. 7 illustrates an exemplary embodiment of the initial offset logic of the synchronization unit shown in FIG. 3, which determines an initial offset value for the unload pointer in accordance with the invention.

FIG. 7 illustrates an exemplary embodiment of the initial offset logic 58. As shown in FIG. 7, the initial offset logic 58 is referenced to the receiving clock 22. The determination of the initial unload pointer offset by the offset logic 58 is triggered by the reset unload signal 68, which is generated upon completion of propagation of the terminating synchronization signal 38 through the synchronizer 56. The initial offset logic 58 is configured to estimate the number of data transmitting edges of the transmitting clock 16 which were received during the synchronization of the terminating synchronization signal 38. In an exemplary embodiment, because the synchronizer 56 has a delay that corresponds to four cycles of the receiving clock 22, the initial offset logic 58 counts the number of edges (i.e., provided by Adjust signal 70) detected by the edge detector 108 for at least four cycles of the receiving clock 22. To obtain a more accurate estimate of the number of edges of the transmitting clock 16, the offset logic 58 may be configured to count the edges for additional cycles of the receiving clock 22 and then determine an average number of edges that occurred. For example, as illustrated in FIG. 7, the offset logic 58 includes an edge counter 150 that counts the edges. After sixteen cycles of the receiving clock 22, delay logic 152 provides a load signal to a register 154 such that the total number of edges counted during the sixteen cycles by the edge counter 150 may be loaded into the register 154. The total number of edges is then divided by a factor of four by a divider 156 to obtain an estimated number of edges of the transmitting clock 16 that occurred during four cycles of the receiving clock 22. In either case, an additional delay in offsetting the unload pointer is incurred during the time the initial offset logic 58 is determining the offset amount. This additional delay may be compensated by a dynamic adjust signal 110 provided by the adjust logic 74 to the unload pointer logic 52 (see FIG. 3), as will be described in more detail below.

Figure 8:
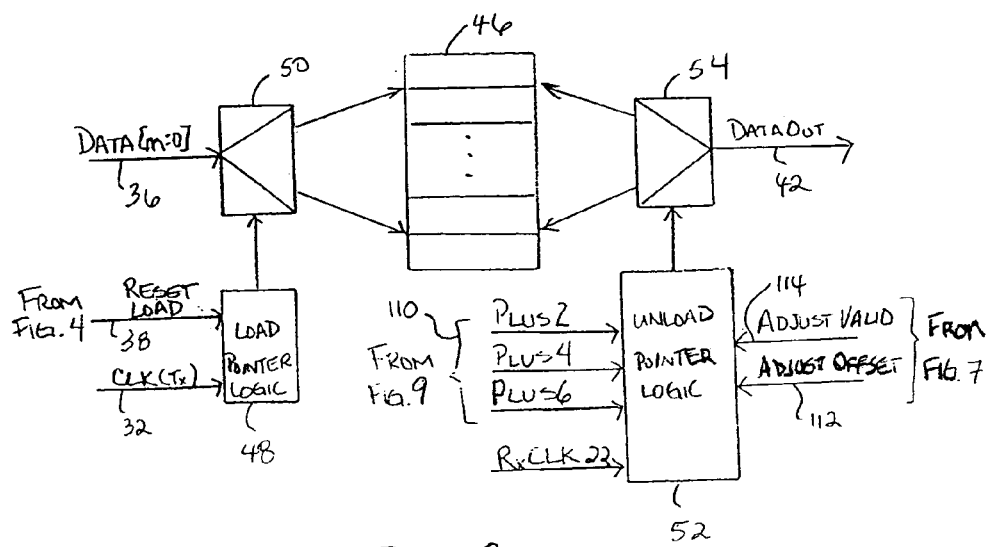
FIG. 8 illustrates the load pointer, buffer, unload pointer in the synchronization unit of FIG. 3, as well as the various signals which are provided to these components in accordance with the invention.

Referring again to FIG. 7, the determined number of edges of the transmit clock 16 that occurred during the synchronization of the terminating synchronization signal 38 is combined with the Margin signal 72 (which corresponds to the minimum unload time) to obtain a value for the Adjust Offset 112. In the exemplary embodiment, subtraction logic 158 determines the difference between the number of edges and the margin amount. The initial offset logic 58 also generates an Adjust Valid signal 114 to indicate that the Adjust Offset 112 is valid. As shown in the exemplary embodiment of FIG. 7, the logic 152 generates the Adjust valid signal 114 after 18 cycles of the receiving clock 22. The Adjust Offset 112 and Adjust Valid 114 signals are provided to the unload pointer logic 52 (see FIG. 8).

After the initial offset is determined and the position of the unload pointer adjusted accordingly, the difference between the positions of the load pointer and unload pointer may be adjusted dynamically to continuously compensate for the difference in the transmitting and receiving time references. It should be understood, however, that if the transmitting and receiving time references are synchronous, then the initial difference between the load and unload pointer positions may be maintained. However, in the exemplary embodiment in which the transmitting and receiving clocks are asynchronous, the difference between the load and unload pointer positions is dynamically adjusted by the adjust logic 74 by adjusting the position of the unload pointer. For example, the adjust logic 74 may determine a new offset amount for the unload pointer every cycle of the receiving clock 22 by monitoring and accumulating the amount of data loaded into the buffer 46 every cycle of the receiving clock 22 relative to the amount of data unloaded from the buffer 46 every cycle of the receiving clock 22.

Referring to FIG. 3, the adjust logic 74 determines the new offset amount every cycle of the receiving clock 22, the value of which is indicated by the dynamic adjust signals 110 provided to the unload pointer logic 52. As discussed above, the dynamic adjust signals 110 may provide additional offset to the initial offset of the unload pointer determined by the initial offset logic 58. This additional offset compensates for the delay incurred by the initial offset logic 58 in determining the Adjust Offset value 112. The dynamic adjust signals 110 also continuously adjust the position of the unload pointer after the initial offset is performed.

Figure 9:
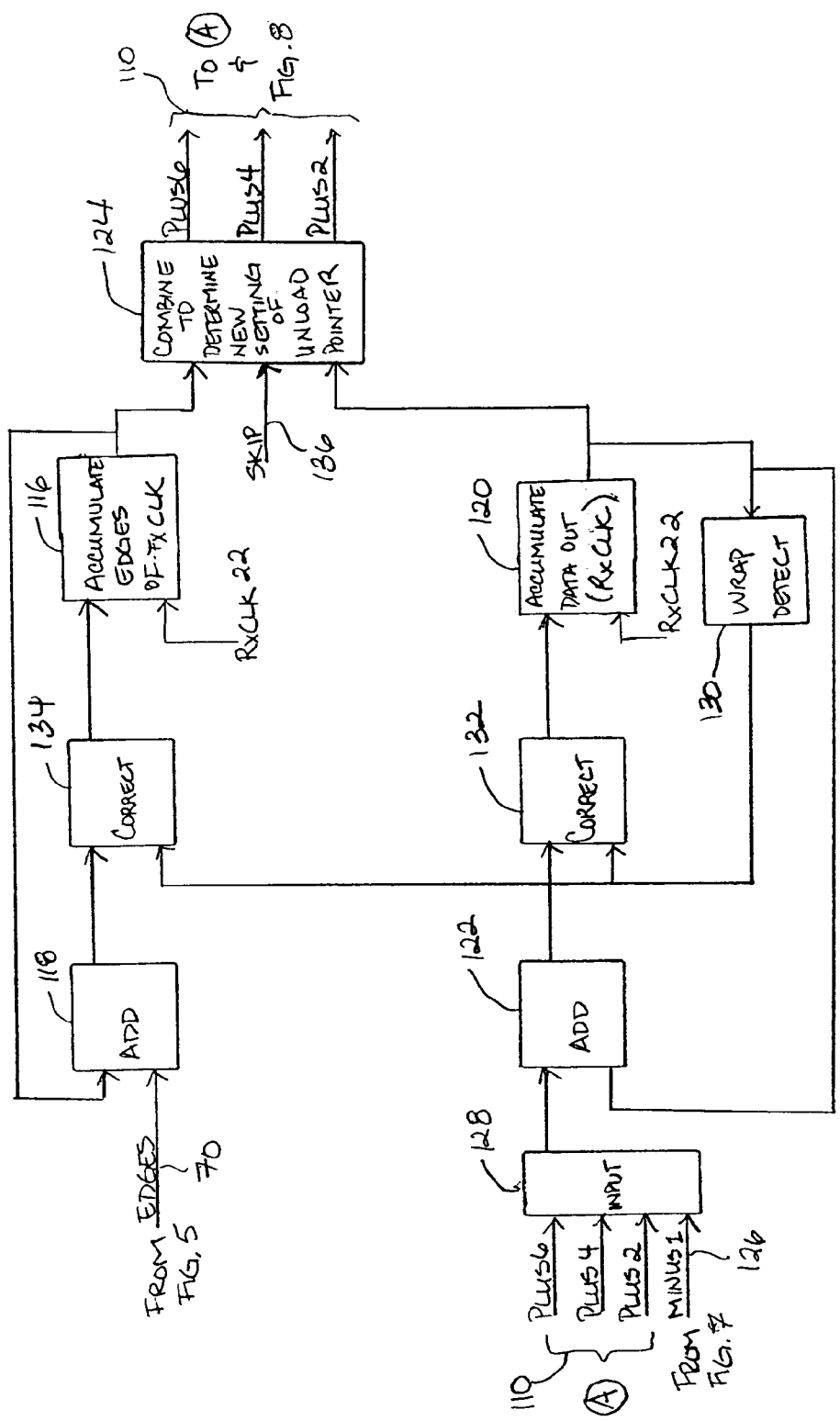
FIG. 9 illustrates an exemplary embodiment of a portion of the unload pointer adjust logic of the synchronization unit shown in FIG. 3, which determines a dynamic adjust value for moving the unload pointer, in accordance with the invention.

An exemplary diagram of the portion of the adjust logic 74 for determining the dynamic adjust value 110 for the unload pointer is illustrated in FIG. 9. The amount of data loaded into the buffer 46 over time is estimated by accumulating the number of edges of the transmitting clock 16 that have occurred over time (block 116). That is, for every cycle of the receiving clock 22, the number of edges of the transmitting clock 22 that occurred during the previous cycle of the receiving clock 22 (as represented by the signal 70) is added (block 118) to the accumulated number of transmitting clock 22 edges.

The amount of data removed from the buffer 46 over time is estimated by accumulating the dynamic offset adjust amounts that have been determined for each receiving clock 22 cycle over time (block 120). That is, for every cycle of the receiving clock 22, the value of the dynamic adjust signal 110 is added (block 122) to the previously accumulated values of the dynamic adjust signal 110.

To determine the new value for the dynamic adjust signal 110, the accumulated number of transmitting clock 22 edges is compared to the accumulated amount of data that has been removed from the buffer 46 to determine the new amount of data that may be removed on the next cycle of the receiving clock 22 (block 124). The dynamic adjust signal 110 then is provided to the unload pointer logic 52 to move the position of the unload pointer by the appropriate amount (see FIG. 8). Thus, for example, if four edges of the transmitting clock 16 have been accumulated, and the position of the unload pointer has not been adjusted (i.e., no data has been removed from the buffer 46), then a value of "PLUS4" for the dynamic adjust signal 110 is provided. In the exemplary embodiment, sixteen bits of data are transmitted on each detected edge of the transmitting clock 16. Thus, four edges of the transmitting clock correspond to 64 bits of data. Accordingly, a dynamic adjust signal of PLUS4 indicates that the unload pointer may be offset appropriately such that 64 bits of data may be removed from the buffer 46. Similarly, if two edges of the transmitting clock 16 have been accumulated, and the accumulated offset of the unload pointer is PLUS2, then a new value of "PLUS2" is provided for the dynamic adjust signal 110 (i.e., 32 bits of data may be unloaded).

As yet another example, if seven edges of the transmit clock 16 have been accumulated, and the accumulated offset of the unload pointer is PLUS2, then a new value of "PLUS2" is provided for the dynamic adjust signal 110, even though more data could be unloaded from the buffer 46. Thus, in this particular embodiment of the adjust logic 74, values of the dynamic adjust signal 110 that result from an odd number of accumulated transmitting clock 16 edges are rounded down to an even value (i.e., PLUS2, PLUS4, PLUS6, etc.).

An odd number of transmitting clock edges initially may be accounted for during the initial offset of the unload pointer, thus further reducing the positional difference between the load pointer and the unload pointer and the resultant data latency. For example, with reference to FIG. 7, if the initial offset logic 58 counts an odd number of transmitting clock 16 edges that occurred during the synchronization of the synchronization signal 38, the offset logic 58 generates a MINUS1 signal 126, which is provided to the input 128 of the dynamic adjust logic 74 illustrated in FIG. 9. The MINUS1 signal 126 thus initially compensates for the detection of an odd number of transmitting clock 16 edges.

The logic illustrated in FIG. 9 also includes a wrap detect logic 130 and correct logic 132 and 134. In an exemplary embodiment, the accumulated counts of the transmitting clock 16 edges (block 116) and the data unloaded from the buffer 46 (block 120) are maintained by counters of fixed length (not shown), which will roll over when the accumulated number exceeds the length of the counter. Thus, to maintain the accumulated count of data removed from the buffer less than the accumulated count of the transmitting clock 16 edges, the wrap detect logic 130 is configured to detect when the unloaded data counter rolls over. The wrap detect logic 130 provides an indication of a roll over to the correct logic 132 and 134, which then adjust the transmitting clock edge counter and the unload counter accordingly.

In the exemplary embodiment illustrated in FIG. 9, a SKIP signal 136 also is combined with the accumulated transmitting clock edges and the accumulated unloaded data to determine the new position of the unload pointer (see block 124). In some computing systems, the transmitting device 10 may be configured to periodically insert skip bytes in the communications sent to the receiving device 12 to prevent an overrun of data in the buffer in the receiving device in cases in which the transmitter frequency of the transmitting device is slightly higher than the receiver frequency of the receiving device. For example, in one embodiment, four skip bytes are inserted for every 512 bytes that are transmitted. Because the skip bytes are not data that is intended to be processed by the receiving device 12, the skip bytes need not be unloaded from the buffer 46. Thus, the SKIP signal 136 is asserted to indicate that the unload pointer may skip over that entry in the buffer 46.

Although the foregoing discussion has referenced asynchronous data communications between separate devices, it should be understood that the invention addresses any type of data communication involving the transmission of data to a receiving time domain that is asynchronous to the transmitting time domain from which the data was sent. Thus, it is contemplated that the asynchronous communication may occur within a single device having multiple time references. Further, the logic described above may be implemented in hardware, software, or any combination thereof. Still further, although the synchronization pattern has been described as a pattern which is generated to initialize the devices in a computing system, it should be understood that the synchronization pattern and the corresponding synchronization signal may be any signal that is used to trigger the reset of the load pointer and the unload pointer.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of synchronizing data to a receiving clock in a receiving clock domain, the method comprising the acts of:

receiving a communication referenced to a transmitting clock in a transmitting clock domain, the transmitting clock being asynchronous to the receiving clock, the communication comprising a synchronization signal and data;

resetting a load pointer in response to receipt of the synchronization signal, the load pointer for loading the data into a buffer synchronous with the transmitting clock;

synchronizing the synchronization signal to the receiving clock;

resetting an unload pointer in response to completion of the synchronizing of the synchronization signal, the unload pointer for unloading the data from the buffer synchronous with the receiving clock; and offsetting the unload pointer by an initial offset corresponding to an amount of data loaded into the buffer during the synchronizing of the synchronization signal.

2. The method as recited in claim 1, wherein the act of synchronizing the synchronization signal to the receiving clock comprises the act of delaying propagation of the synchronization signal into the receiving clock domain.

3. The method as recited in claim 1, comprising the acts of:
incrementing the load pointer to load the data into the buffer synchronous with the transmitting clock; and
dynamically adjusting a positional difference between the load pointer and the unload pointer.

4. The method as recited in claim 3, wherein the act of dynamically adjusting the positional difference between the load pointer and the unload pointer comprises the acts of:
dynamically determining an adjustment increment for the unload pointer; and
adjusting the unload pointer by the adjustment increment to unload the data from the buffer synchronous with the receiving clock.

5. The method as recited in claim 4, wherein the act of dynamically determining the adjustment increment comprises the acts of:
determining an amount of data loaded into the buffer;
determining an amount of data unloaded from the buffer; and
determining the adjustment increment based on the amount of data unloaded from the buffer and the amount of data loaded into the buffer.

6. The method as recited in claim 5, wherein the communication comprises a transmitting clock signal having a plurality of edges, the transmitting clock signal being representative of the transmitting clock, and the act of determining the amount of data loaded into the buffer comprises the act of counting a number of the plurality of edges of the transmitting clock signal received during each cycle of the receiving clock.

7. The method as recited in claim 6, wherein the plurality of edges of the transmitting clock signal comprise data transmitting edges, each of the data transmitting edges corresponding to the receiving of the data.

8. The method as recited in claim 7, wherein counting the number of the plurality of edges of the transmitting clock signal comprises:
providing a plurality of phase signals synchronous with the transmitting clock signal, each phase signal having a phase signal frequency, each of the plurality of phase signals being offset in time with respect to the other phase signals of the plurality of phase signals, such that each data transmitting edge of the transmitting clock signal corresponds to an edge of a respective one of the plurality of phase signals; and
detecting a total number of the edges of the plurality of phase signals occurring during each cycle of the receiving clock.

9. The method as recited in claim 8, wherein the act of detecting the total number of the edges comprises sampling each of the plurality of phase signals at a sampling frequency, wherein the phase signal frequency is less than one-half the sampling frequency.

10. The method as recited in claim 8, wherein the data transmitting edges comprise rising edges.

11. The method as recited in claim 1, wherein the communication comprises a transmitting clock signal having a plurality of edges, the transmitting clock signal being representative of the transmitting clock, and the act of offsetting the unload pointer comprises the act of:
counting a number of the plurality of edges of the transmitting clock signal received during the act of synchronizing the synchronization signal.

12. The method as recited in claim 11, wherein the plurality of edges of the transmitting clock signal comprise rising edges.

13. The method as recited in claim 1, wherein the synchronization signal corresponds to termination of a synchronization pattern.

14. The method as recited in claim 1, comprising:
altering the initial offset by a Margin amount corresponding to a minimum unload time for unloading the data from the buffer synchronous with the receiving clock.

15. A method of synchronizing data to a receiving clock in a receiving clock domain, the method comprising the acts of:
receiving a communication referenced to a transmitting clock in a transmitting clock domain, the transmitting clock being asynchronous to the receiving clock, the communication comprising a synchronization signal and data;
resetting a load pointer in response to receipt of the synchronization signal, the load pointer for loading the data into a buffer synchronous with the transmitting clock;
providing a synchronization delay of the synchronization signal into the receiving clock domain, when synchronizing the synchronization signal to the receiving clock; and
determining an unload position for an unload pointer in response to completion of the synchronizing of the synchronization signal, the unload pointer for unloading the data from the buffer synchronous with the receiving clock, the unload position compensating for the synchronization delay.

16. The method as recited in claim 15, wherein the act of determining the unload position of the unload pointer comprises the acts of:
determining an amount of data loaded into the buffer during the synchronization delay; and
determining the unload position based on the amount of data.

17. The method as recited in claim 16, wherein the act of determining the unload position of the unload pointer comprises the acts of:
determining a minimum unload time for unloading the data from the buffer synchronous with the receiving clock; and
determining the unload position based on the minimum unload time.

18. The method as recited in claim 16, wherein the act of determining the unload position introduces a calculation delay, and the method comprises the acts of:
determining the calculation delay; and
adjusting the unload position to compensate for the calculation delay.

19. The method as recited in claim 18, wherein the act of determining the calculation delay comprises the act of determining an amount of data loaded in the buffer during the calculation delay.

20. The method as recited in claim 15, comprising the acts of:
setting the unload pointer to the unload position; and
dynamically adjusting a positional difference between the unload pointer and the load pointer.

21. The method as recited in claim 20, wherein the act of dynamically adjusting the positional difference between the unload pointer and the load pointer comprises the acts of:
dynamically determining an adjustment increment for the unload pointer; and
adjusting the unload pointer by the adjustment increment to unload the data from the buffer synchronous with the receiving clock.

22. The method as recited in claim 21, wherein dynamically determining the adjust increment comprises the acts of:

- determining an amount of data loaded into the buffer;
- determining an amount of data unloaded from the buffer; and
- determining the adjustment increment based on the amount of data unloaded from the buffer and the amount of data loaded into the buffer.

23. A device connected in a computing system, the device comprising:

- a core clock; and
- a receive port configured to receive a communication referenced to a transmitting clock asynchronous to the core clock, the communication comprising data and a synchronization signal, the receive port comprising:
  - a synchronizer to receive the synchronization signal and synchronize the synchronization signal to the core clock;
  - a buffer;
  - load logic to load the data received at the receive port into the buffer synchronous with the transmitting clock;
  - unload logic to unload the data from the buffer synchronous with the core clock; and
  - unload offset logic in communication with the synchronizer and the unload logic,
- wherein the load logic resets a load pointer to a reset position in response to receipt of the synchronization signal by the synchronizer, and wherein the unload offset logic is configured to provide an offset amount to the unload logic to offset an unload pointer from the reset position in response to synchronization of the synchronization signal to the core clock.

24. The device as recited in claim 23, wherein the synchronizer is configured to delay propagation of the synchronization signal through the synchronizer by a synchronization delay.

25. The device as recited in claim 24, wherein the offset amount provided by the unload offset logic compensates for the synchronization delay.

26. The device as recited in claim 25, wherein the offset amount provided by the unload offset logic is adjusted by a Margin amount corresponding to a minimum unload time to unload the data from the buffer synchronous with the core clock.

27. The device as recited in claim 23, comprising:

- dynamic adjust logic in communication with the unload logic, the dynamic adjust logic configured to dynamically determine an adjustment increment for the unload pointer based on an amount of data loaded into the buffer and an amount of data unloaded from the buffer.

28. The device as recited in claim 27, wherein the communication comprises a transmitting clock signal having a plurality of data transmitting edges, each of the data transmitting edges corresponding to receipt of the data at the receive port, and wherein the device comprises:

- an edge detector to detect a number of data transmitting edges in the received communication, wherein the detected number of the data transmitting edges correlates to the amount of data loaded into the buffer.

29. The device as recited in claim 23, wherein the communication comprises a transmitting clock signal having a plurality of edges, and the device comprises:

- an edge detector to detect a number of the edges of the transmitting clock signal received while the synchronizer synchronizes the synchronization signal to the core clock, and wherein the offset amount of the unload pointer is correlated to the detected number of the edges.

30. The device as recited in claim 29, comprising:

- dynamic adjust logic in communication with the unload logic, the dynamic adjust logic configured to dynamically determine an adjustment increment for the unload pointer based on an amount of data loaded into the buffer and an amount of data unloaded from the buffer.

31. The device as recited in claim 29, wherein the plurality of edges comprises a plurality of data transmitting edges, each of the plurality of data transmitting edges representative of receipt of the data at the receive port.

32. A method of receiving data referenced to a transmitting clock into a receiving clock domain referenced to a receiving clock, the method comprising the acts of:

- receiving a communication referenced to a transmitting clock in a transmitting clock domain, the communication comprising an initialization signal and data;
- resetting a load pointer in response to receipt of the initialization signal, the load pointer for loading the data into a buffer;
- delaying propagation of the initialization signal into the receiving clock domain; and
- determining an unload position of the unload pointer in response to completion of propagation of the initialization signal into the receiving clock domain, the unload position compensating for the delaying of propagation, the unload pointer for unloading the data from the buffer.

33. The method as recited in claim 32, wherein the transmitting clock is asynchronous to the receiving clock.

34. The method as recited in claim 33, comprising the acts of:

- setting the unload pointer to the unload position; and
- dynamically adjusting a positional difference between the load pointer and the unload pointer.

35. The method as recited in claim 32, wherein the act of dynamically adjusting the positional difference comprises the acts of:

- dynamically determining an adjustment increment for the unload pointer; and
- adjusting the unload pointer by the adjustment increment to unload the data from the buffer synchronous with the receiving clock.

* * * * *